United States Patent [19]

Santesson

[11] Patent Number: 4,972,481

[45] Date of Patent: Nov. 20, 1990

[54] CIPHERING AND DECIPHERING DEVICE

[75] Inventor: Stefan Santesson, Lund, Sweden

[73] Assignee: Datakonsult I Malmo AB, Malmo, Sweden

[21] Appl. No.: 285,970

[22] PCT Filed: Jun. 9, 1986

[86] PCT No.: PCT/SE86/00275

§ 371 Date: Feb. 2, 1989

§ 102(e) Date: Feb. 2, 1989

[87] PCT Pub. No.: WO87/07796

PCT Pub. Date: Dec. 17, 1987

[51] Int. Cl.⁵ .............................................. H04K 1/00
[52] U.S. Cl. ........................................ 380/49; 380/50
[58] Field of Search .................................. 380/49, 50

[56] References Cited

U.S. PATENT DOCUMENTS

| | | | |
|---|---|---|---|
| 3,984,668 | 10/1976 | Zetterberg | 380/46 |
| 4,133,974 | 1/1979 | Morgan | 380/46 |
| 4,176,247 | 11/1979 | Englund | 380/50 |
| 4,404,426 | 9/1983 | Safford | 380/50 |
| 4,431,865 | 2/1984 | Bernede et al. | 380/50 |
| 4,596,898 | 6/1986 | Pemmaraju | 380/50 |
| 4,742,544 | 5/1988 | Kupnicki et al. | 380/50 |
| 4,817,148 | 3/1989 | Lafferty et al. | 380/49 |

Primary Examiner—Salvatore Cangialosi
Attorney, Agent, or Firm—Brooks & Kushman

[57] ABSTRACT

A ciphering system comprises a ciphering device having an input for a sequence of bits to be ciphered, and output for the ciphered bit sequence, and a mixing unit connected between the input and the output. The mixing unit receives both the bit sequence to be ciphered and a sequence of code bits for ciphering the bit sequence and, by a mixing operation, generates the ciphered bit sequence. The output of the mixing unit is connected to a first code unit for generating code bits. The first code unit comprises a memory addresses with bits from the ciphered bit sequence. The first code unit is furthermore connected to a second code unit, which comprises a memory containing code bits and the output of which is connected to the mixing unit. The deciphering device of the ciphering system is conceived in the same manner as the ciphering device, with the exception that the input of the code unit receives input signals from the input of the deciphering device.

8 Claims, 6 Drawing Sheets

CIPHERING AND DECIPHERING DEVICE

The present invention relates to a ciphering device for serially transmitted information, comprising an input for a sequence of bits to be ciphered, an output for the ciphered bit sequence, and a mixing unit connected between the input and the output, said mixing unit being adapted to receive both the bit sequence to be ciphered and a sequence of code bits for ciphering said bit sequence, and, by a mixing operation, to generate the ciphered bit sequence, and a code unit adapted to generate code bits and comprising a shift register into which bits from the ciphered bit sequence are shifted, and a memory containing code bits and addressed with bits from the shift register.

The invention also relates to a deciphering device which is associated with the ciphering device and designed for serially transmitted information, and which comprises an input for a sequence of bits to be deciphered, an output for the deciphered bit sequence, and a mixing unit connected between the input and the output, said mixing unit being adapted to receive both the bit sequence to be deciphered and a sequence of code bits for deciphering said bit sequence, and, by a mixing operation, to generate the deciphered bit sequence, and a code unit adapted to generate code bits and comprising a shift register into which bits from the ciphered bit sequence are shifted, and a memory containing code bits and addressed with bits from the shift register.

The use of computers, and especially the transmission of information between computers, has given rise to serious security problems. It is in fact relatively easy to tap data transmission, implying that sensitive information may come into the wrong hands. To obviate this risk, the information transmitted is often ciphered.

Data communication normally takes place in binary form and in most of the ciphering systems hitherto known, ciphering takes place on the bit level in that the sequence of 1's and 0's making up the message is mixed in a ciphering device with a sequence of code bits. When deciphering the message, the ciphered bit sequence is mixed with the same code bit sequence, whereby the message is received in clear.

In hitherto known ciphering devices, the generation of code bits however takes a long time, causing delays in the transmission of information. This means that it is necessary either to decrease the rate at which the transmitter transmits the information or to provide buffers in the ciphering unit. In the latter case, measures must be taken to ensure that information is not lost when the receiving unit emits a signal indicating that it is no longer ready to receive information. Another difficulty resides in synchronizing the generation of code bits. In some devices (see e.g. GB 1,388,035), the information transmission is interrupted at regular intervals for checking whether the code bits in the ciphering and the deciphering device are synchronized. A third problem arises when the ciphering and the deciphering device should be linked to each other after an interruption of the data transmission. Such linking should preferably be effected rapidly and easily without any loss of information and without transmission of information that may give an indication of how the code bits are generated.

The above-mentioned problems entail that known ciphering devices become very expensive since a large number of sophisticated circuits are required for solving the synchronization and link-up problems. Further, the known devices cannot be used in systems with severe demands on a high transmission rate.

For parallel transmission, the above-mentioned synchronization and link-up problems have however been solved by means of a ciphering device shown in U.S. patent specification 4,431,865, which comprises a logic unit in which parallel-transmitted words to be ciphered are mixed with code words to obtain the ciphered words. The code words are generated by supplying the output signal from the logic unit, i.e. the ciphered words, to an addressing circuit comprising a parallel-to-series converter, a shift register and a selecting circuit. The selecting circuit selects some or all of the bits in the register for addressing a memory containing code words supplied to the logic unit. The device further comprises a computer which serves to supply code words to the memory and which during that operation can disconnect the register and the selecting circuit. The deciphering apparatus corresponding to this ciphering device is designed in a similar way, with the only exception that coded words are mixed in the logic unit with code words for obtaining the deciphered text.

As mentioned above, this device is however intended for use in connection with parallel information transmission and cannot be used for serial information transmission without prior modifications. Further, the device is designed for ciphering information from teletext systems and the like. Thus, it is not deisgned for protecting the transmitted information from unauthorized persons who may be interested in employing the information for commerical and/or illegal use, but instead for making people pay the subscription fee for this type of service. Anyone who manages to decipher the transmitted information will not have access to any secret information but only to information which may possibly be used for private purposes. In view hereof, this device has not been conceived so as to satisfy the high demands on security which must be placed on ciphering apparatuses intended for use in transmitting information between computers, and especially such information as should be kept secret for a long time after the transmission has been effected and, thus, should not allow subsequent deciphering. The problem inherent in this device is in fact that for each word to be coded there is generated only one address to the memory, and that the entire word on this address is used for the coding. If the same information sequence is transmitted repeatedly, there is a risk that the coding takes place in the same way, which substantially facilitates unauthorized deciphering. Further, if the deciphering apparatus is stolen, previously tapped information may very well be deciphered by means of the deciperhing apparatus.

The object of the present invention therefore is to provide a ciphering and deciphering system for serial information transmission which meets the very high demands on security placed on systems for ciphering secret information, both during and after the transmission, which is less expensive than corresponding known systems, which does not notably limit the transmission rate and in which the synchronization and link-up problems have been overcome.

According to the invention, this object is achieved by means of a ciphering device of the type stated in the introduction to this specification, which is characterized by first means for selecting whether a bit in the bit sequence to be ciphered should be mixed with a code bit or not, and by means of a deciphering device of the type stated in the introduction to this specification, which is characterized by first means for selecting whether a bit in the bit sequence to be deciphered should be mixed with a code bit or not.

In a preferred embodiment of the invention, the devices comprise means for selecting which bits in the ciphered bit sequence should be used as address to the memory. These means, like the means for selecting whether a bit in the bit sequence should be mixed with a code bit or not, may advantageously be controlled by a programmable unit.

The ciphering and deciphering system described above offers fully satisfactory protection against external tapping or deciphering attempts. In order to ensure that no one who has access to the message both in ciphered form and in clear should be able to map the content in the memory and subsequently use it for deciphering tapped information, the ciphering and deciphering system in another embodiment comprises a further code unit the input of which is connected to the first code unit and which comprises a shift register and a memory containing code bits and addressed with bits from the shift register, and the output signal of which constitutes the code bit sequence for ciphering the bit sequence. When this additional code unit is used, it becomes impossible for anyone who has access to a message both in ciphered form and in clear, to map the content in the memories of the two code units.

It should however be possible, instead of establishing the specific contents of the memories, to determine a very large memory replacing the other two memories. One way of overcoming this problem is to increase the number of bits which are required for the memories to have their specific address. In a further embodiment, the present invention therefore comprises a shift register which is disposed between the two code units and the input of which is connected to the first code unit, and an EXOR gate which on its inputs receives bits from the shift register and the output of which is connected to the shift register of the second code unit. In this manner, it is possible to increase the number of addresses to the replacement memory which thus becomes so large that it is impossible to map it in a reasonable time.

A further problem solved by the present invention is that related to information which should be kept secret for a long time after the transmission. In hitherto known devices, there is in fact a risk that unauthorized persons may tap the transmission of information and subsequently steel a deciphering device in order to decipher the tapped information. To prevent this, the present invention comprises in a further embodiment a shift register which is disposed between two code units and the input of which is connected to the first code unit, and a read-write memory which is addressed with bits from the shift register and the output of which is connected to the second code unit. The device further comprises a computer which is adapted to generate code bits according to a predetermined algorithm and to write the generated code bits into the memory at regular intervals. If the algorithm is of the type which generates a code that cannot be traced mathematically backwards in time, it becomes impossible to decipher previously tapped information by means of the deciphering device. The security requirement for information to be kept secret after the transmission is thus satisfied.

The system according to the present invention has solved the problems inherent in prior art devices. Thus, there is no need of any special circuits for buffering or for handling control, checking and synchronizing signals, but the system can be composed of a few standard circuits, this making the system considerably cheaper than other corresponding systems.

Figure 1:
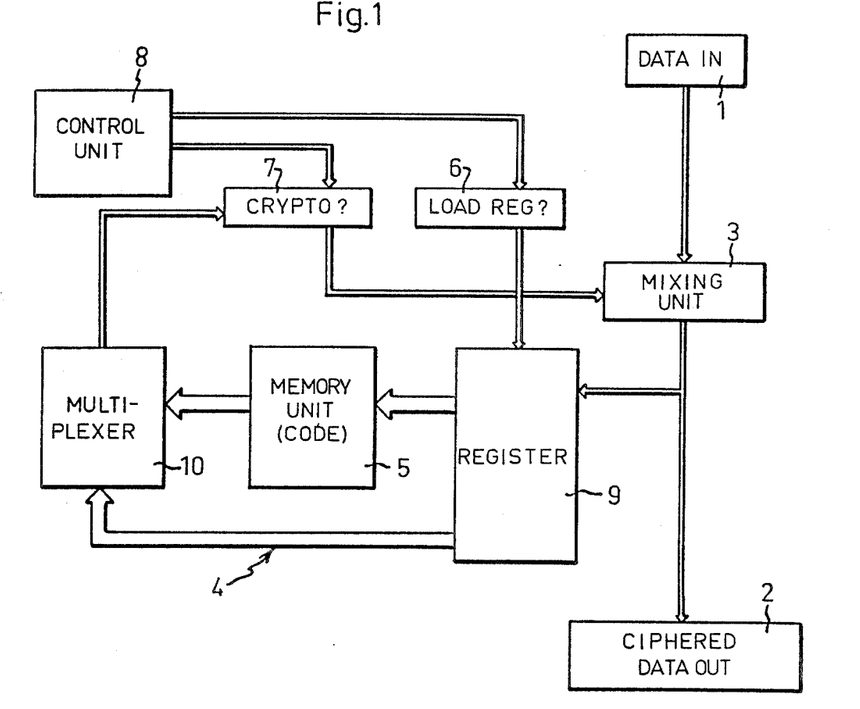
FIG. 1 is a block diagram of a ciphering device according to the present invention.

In FIG. 1, there is shown a ciphering device which is intended to be connected in a data link between a transmitting and a receiving unit, on the transmitting side. This ciphering device substantially comprises an input 1 for information in clear from the transmitting unit, an output 2 for ciphered information, a mixing unit 3 consisting of an EXOR gate, a code unit 4 for generating the code bits in the code bit sequence, and means 6, 7, 8 controlling certain selections in the device, as will be described in more detail hereinbelow. The code unit 4, which has an input connected to the output of the mixing unit 3, consists of a 16-bit shift register 9, a memory 5 which may be a byte-organized ROM or EPROM, and a multiplexer 10. The first thirteen bits of the shift register 9 are connected to the address inputs of the memory 5 and its last three bits are connected to the address inputs of the multiplexer 10. The outputs of the memory 5 are connected to the data inputs of the multiplexer 10. As mentioned above, certain selections can be carried out in the ciphering device. The selections relate to whether an incoming data bit should be ciphered or not, and whether a ciphered bit should be loaded into the shift register 9 or not. The selections are controlled by the control unit 8 which is programmable. Its program follows one word (one word = one byte) through the ciphering and recommences at the beginning of the next word. For each bit in the word, a signal is supplied to one input of the means 7, which may consist of a logic AND gate, for determining whether the bit should be ciphered or not, and another signal is supplied to one input of the means 6, which may also consist of an AND gate, for determining whether the ciphered bit should be loaded into the register or not. The gate 7 receives on its other input a code bit from the multiplexer 10 and has its output connected to the mixing unit 3. The output of the gate 6 is connected to an enabling input of the register 9.

Figure 2:
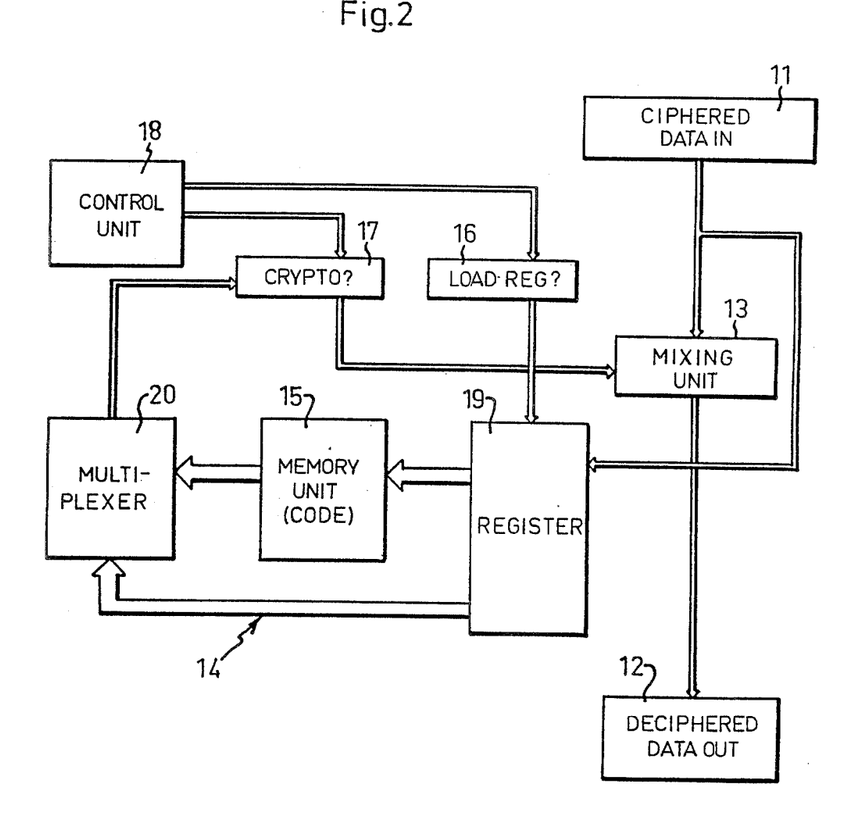
FIG. 2 is block diagram of a deciphering device corresponding to the ciphering device of FIG. 1.

The deciphering device shown in FIG. 2 is intended to be connected in the other end of the data link to which the ciphering device is connected, before the receiving unit. On its input 11, the deciphering device receives ciphered data from the ciphering device and, on its output 12, supplies deciphered data to the receiving unit. The deciphering device is built up in the same manner as the ciphering device, with the exception that the shift register 19 is connected to the input 11. Otherwise, the two devices consist of the same components and contain the same information (in the memories and the control units), and the deciphering device will therefore not be described in more detail here.

In the following description, the function of the ciphering system will be described, starting with the generation of code bits. When the ciphering system is in operation, the shift register 9 is loaded with ciphered bits from the output of the mixing unit 3. A memory cell in the memory 5 is addressed with the first thirteen bits in the register. The content of the memory cell is supplied to the data inputs of the multiplexer 10 which by means of the last three bits in the register 9 selects which of the eight bits in the addressed memory word should constitute a code bit.

This way of generating a code bit also functions before any code bits have been loaded into the shift register 9 from the output of the mixing unit 3 since 0's alone may also form an address to the memory and the multiplexer. Thus, no special initiation routine is required when starting up the ciphering system.

When a bit in the bit sequence to be ciphered is presented on the input of the mixing unit 3, the control unit 8 supplies the gate 7 with a signal which indicates whether the code bit on the output of the multiplexer 10 should be supplied to the input of the mixing unit 3 and mixed with the bit concerned or whether this bit should pass through the mixing unit without being ciphered. This option of ciphering or not ciphering a bit makes the system still more reliable and, moreover, provides the possibility of allowing e.g. start and stop bits to pass through unciphered.

Further, the control unit 8 emits to the gate 6 a signal which indicates whether the bit concerned should be loaded into the register 9 or not, after it has passed through the mixing unit 3. If the bit is loaded into the register, the address to the memory 5 and to the multiplexer 10 is changed, and a new code bit is obtained. In some cases, it may be convenient not to load bits from the mixing unit 3 into the register 9, for instance in the case of start and stop bits which when passing through unciphered always look the same. Naturally, this option also enhances the security of the system.

The deciphering device operates in the same way. Since it is the same program that is in the control unit 18, the same bits will be loaded into the register 19, the same memory cells will be addressed in the memory 15 whose content must of course be the same as in the memory 5 of the ciphering device, the same code bits will be generated and the same bits will pass unciphered through the mixing unit 13. Thus, the ciphered bits will be mixed with the same code bits as they were mixed with in the ciphering device, and since the mixing unit consists of an EXOR gate, the original message will be recovered in clear on its output.

If a temporary interruption should occur on the data link, only the data which are output during the interruption will be lost. When the connection is again established, the contents of the registers 9, 19 may be entirely different, but since the same information is supplied to the two registers, the devices will soon be synchronized again. The time it takes for the devices to be synchronized depends on the program in the control unit and the length of the shift register. In this embodiment, it takes three words at most (one word =one byte).

The ciphering system described above is very fast. It is possible to communicate at a rate of up to 2 MBaud duplex. There is minimal delay in the ciphering device. A data bit will leave the mixing unit in ciphered form after only T/2 where T =the time a data bit is active. This short delay time means that handshaking lines in an RS-232 port need not be processed in the ciphering device, but merely be sent unprocessed straight through it.

Although the ciphering system is of such a simple design, it is completely protected also from those who know exactly how it operates. The result of the ciphering operation depends on the message ciphered, the content in the memory 5 and the program in the control unit 8. In order to decipher messages, it is thus necessary to have access to the content in the memory and the program in the control unit. If there is even the faintest suspicion that the content in the memory and/or the control unit is known, the memory and/or the program in the control unit may very easily be exchanged. The control unit may also store several programs which are alternatingly connected by means of a push-button set associated with the control unit.

Figure 3:
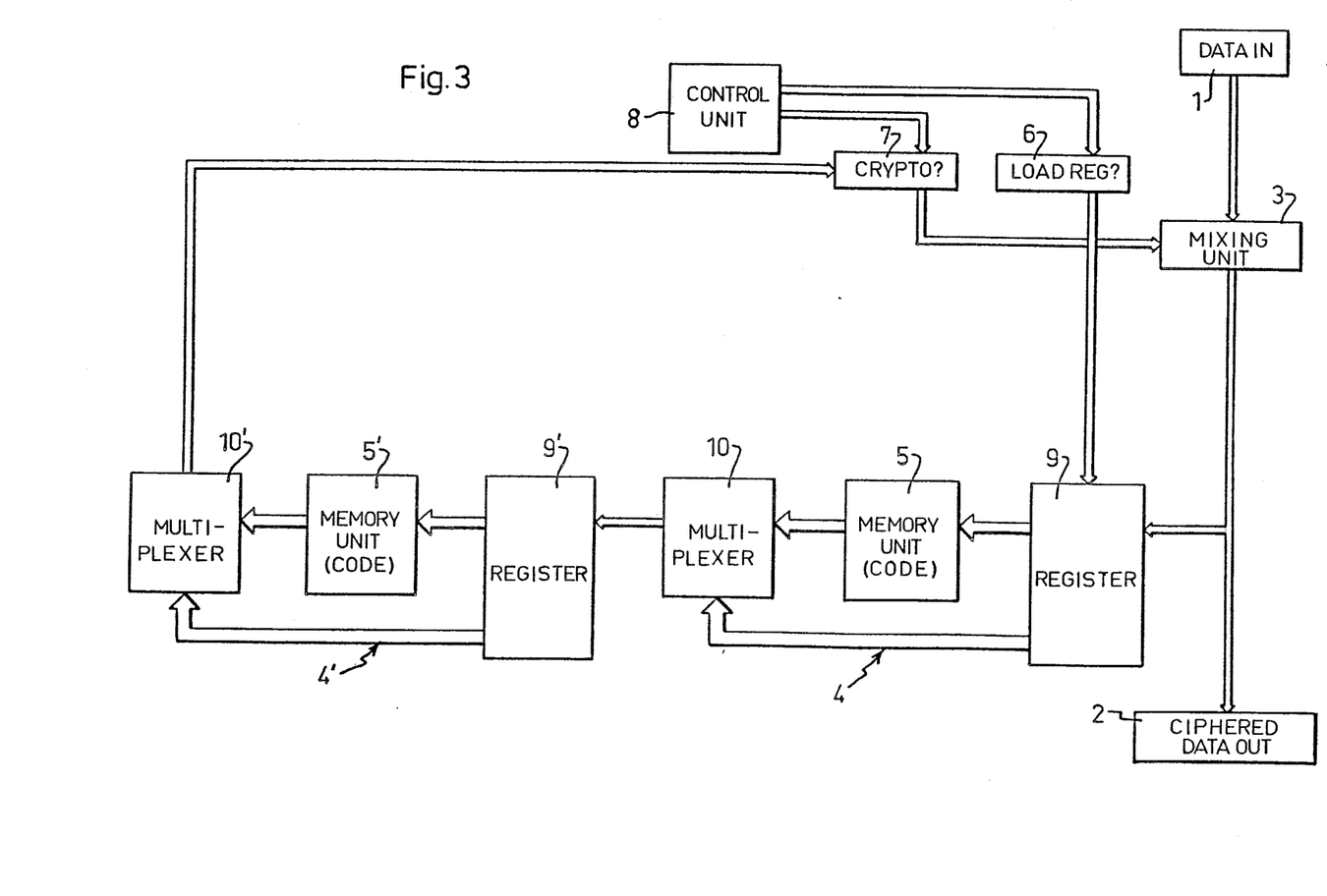
FIG. 3 is a block diagram showing one embodiment of the ciphering device having double code units.

In FIG. 3, there is shown an embodiment of the ciphering device preventing anyone who has access to a message both in clear and in ciphered form from mapping the content in the memory by using the formula "clear EXOR ciphered text =code". In FIG. 3, the components shown in FIG. 1 appear with the same reference numerals. These units operate in the same manner as in the device shown in FIG. 1 and, therefore, will not be described here. In addition to these components, the device comprises a second code unit 4' the input of which is connected to the output of the first code unit 4 and which is designed in the same way as this, namely with a 16-bit shift register 9', a memory 5', which may be a byte-organized ROM or EPROM, and a multiplexer 10'. In this embodiment of the invention, the code bits generated by the code unit 4 are supplied to the shift register 9', the first thirteen bits of which are used for addressing the memory 5' and the last three bits of which serve as input signal to the multiplexer 10' for selecting which bit in the word addressed in the memory 5' should constitute a code bit. In this embodiment of the device, the addresses to the memory unit 9 in the first code unit and the code from the memory 5' in the second code unit are related in no readable way to each other and, hence, it is not possible by tapping the input signals to and the output signals from the system, to map the content in the memories 5 and 5'. The deciphering device corresponding to this ciphering device is designed in a corresponding way and will therefore not be described here.

Figure 4:
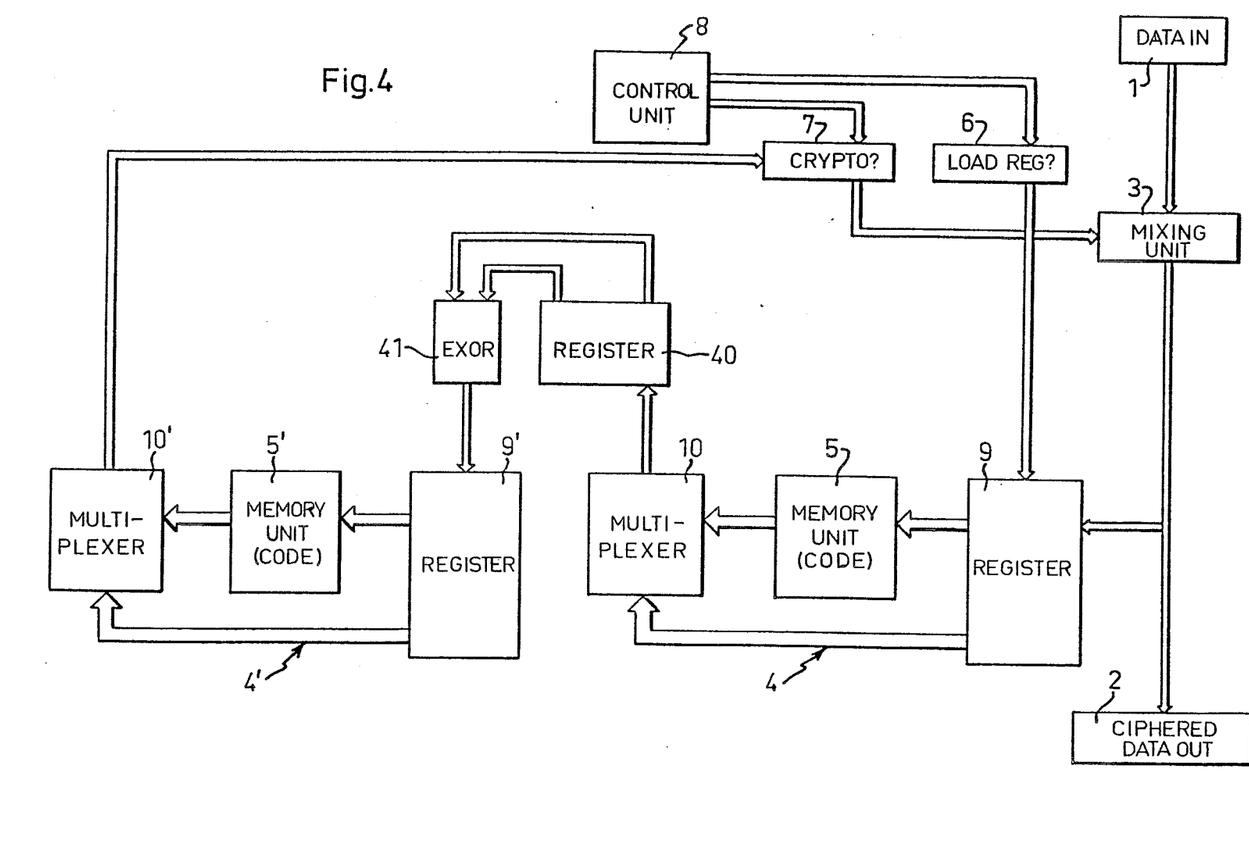
FIG. 4 is a block diagram showing one embodiment of the ciphering device having a shift register and an EXOR gate between the code units.

In FIG. 4, the device of FIG. 3 is supplemented with a shift register 40 and an EXOR gate 41. The shift register 40 receives on its input the code bits generated by the code unit 4. The first and the last bit in the shift register 40 are used as input signals to the EXOR gate 41 whose output is connected to the shift register 9' in the second code unit 4'. By incorporating these two components in the device, the number of addresses which would have to be mapped to create a replacement memory for the memories 5 and 5' is considerably increased. If the length of the shift register 40 and of the shift registers 9 and 9' is 16 bits, the required number of addresses will be $2.81 \times 10^{14}$. When the shift register 40 and the EXOR gate 41 have been incorporated, it will thus be impossible in a reasonable time to create a replacement memory for the other two memories. Further, when the system is correctly used the risk of periodic output data appearing in the cryptogram in connection with periodic input data will be eliminated in clear because of the extension of the registers by means of the shift register 40. The corresponding deciphering device (not shown) has a shift register and an EXOR gate which are connected in the same manner.

Figure 5:
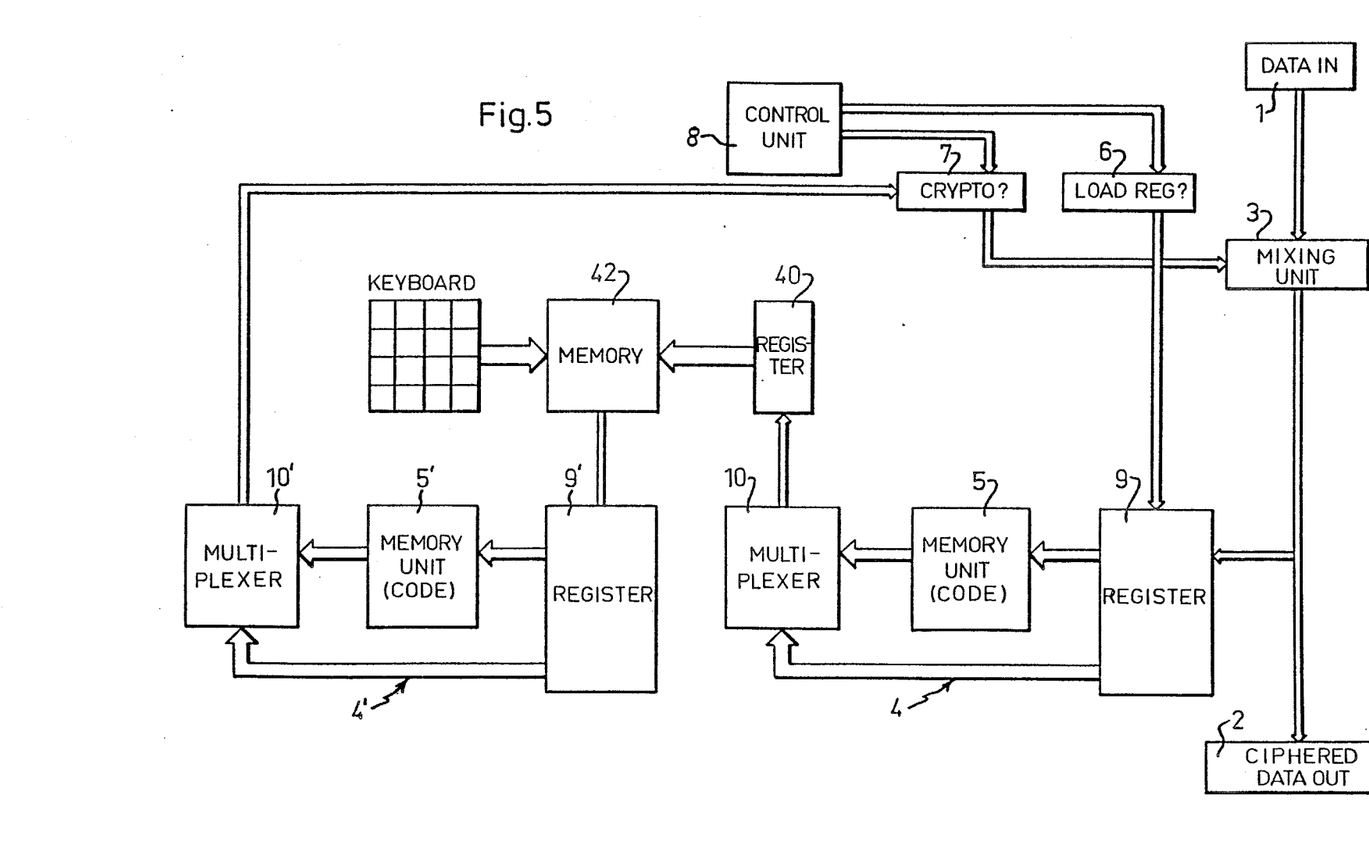
FIG. 5 is a block diagram showing one embodiment of the ciphering device having a shift register and a programmable memory between the two code units.

In FIG. 5, there is shown a variant of the device illustrated in FIG. 4, in which the EXOR gate 41 has been replaced by a read-write memory 42 which is addressed with the content in the shift register 40 and the output of which is connected to the shift register 9' in the second code unit 4'. The content in the memory 42 can be exchanged by programming a new code from a keyboard 43. The purpose of the memory 42 is to prevent the transmitted, ciphered information from being deciphered afterwards if anyone having tapped the transmitted information later appropriates a deciphering device. In order to decipher a message, it is thus necessary to have access to the code being in the memory 42 during the ciphering operation, and if this code is changed at regular intervals, subsequent deciphering will be impossible. The only thing that need be ensured is that the memory contains a sufficient amount of code so that subsequent deciphering cannot be effected by trying all possible codes which the memory might contain. As in the other embodiments, the deciphering device (not shown) is designed correspondingly.

Figure 6:
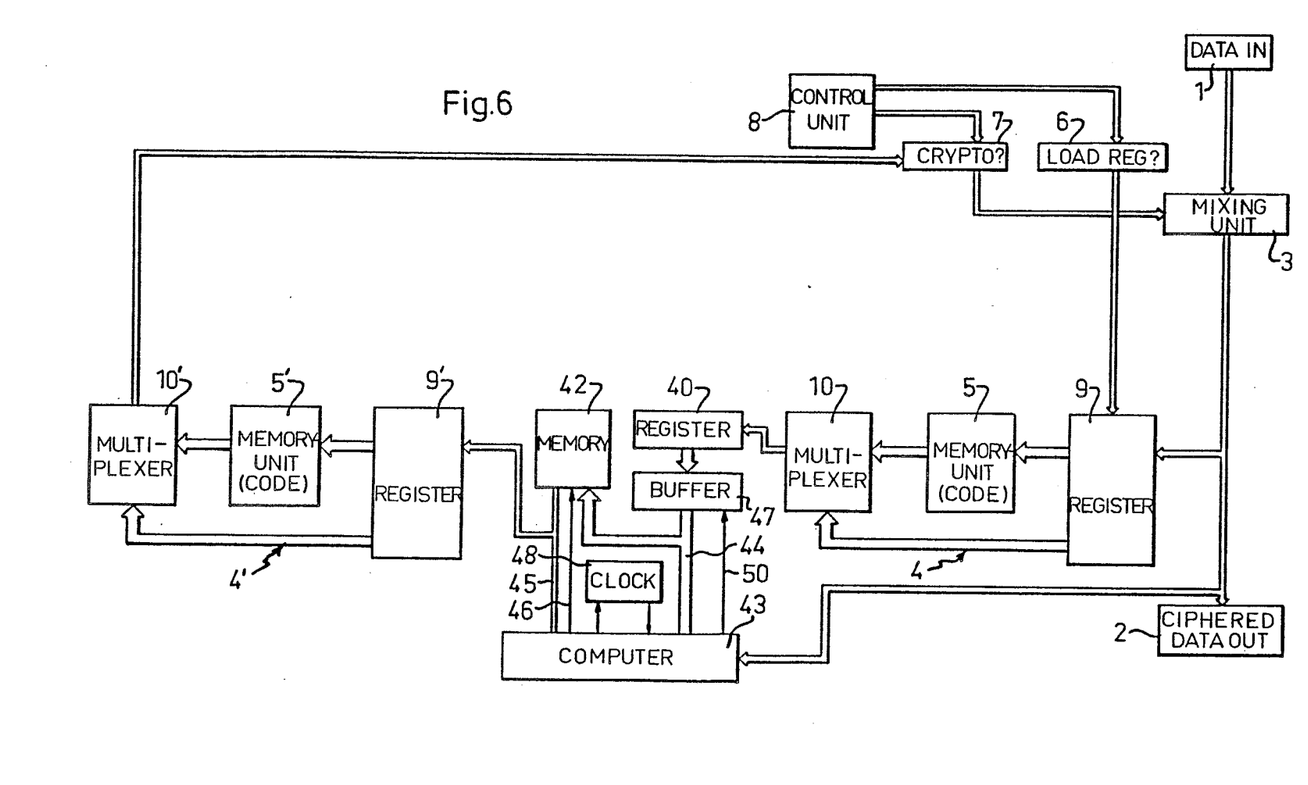
FIG. 6 is a block diagram showing one embodiment of the ciphering device comprising a code handling system between the two code units.

In FIG. 6, there is shown a variant of the ciphering device of FIG. 5, which overcomes the practical problems linked with the handling and transmission to the deciphering device of the codes which are supplied to the memory 42, and with the work effort required for thus supplying the codes at regular intervals. The variant of the ciphering device illustrated in FIG. 6 comprises, in addition to the shift register 40 and the memory 2, a computer 43 having an input which by a line 51 is connected to the output of the mixing unit 3, address outputs which by an address bus 44 are connected to the memory 42, an in/output which by a data line 45 is connected to the memory 42, and a control signal output for transmitting a read-write signal on a line 46 to the memory 42. The device further comprises a buffer 47 which is connected to the shift register 40 and in which the content in the shift register is temporarily stored and which has tristate outputs connectible to the address bus 44. Finally, the device comprises a clock 48 which is programmable from the computer 43 which may be a one-chip computer having a nonvolatile and a volatile memory. The memory of the computer contains an algorithm which is stored in software and by means of which the computer creates a new code for the memory 42. The code is created during different time periods, and the length of a current time period is determined by the code created during the preceding time period, the clock 48 being used for establishing when a time period is terminated. When the code generated during a time period is finally created, it is temporarily stored in a buffer, awaiting the transmission to the memory 42. The computer 43 establishes suitable points of time for the transmission by analyzing the signals on the output from the mixing unit 3. When a predetermined event occurs, for example no signals present on the output, the code temporarily stored in the buffer is transmitted to the memory. The computer then disconnects the outputs of the buffer 47 from the address bus by means of a control signal on a line 50, emits a write signal on the line 46 and addresses the memory via the address bus 44 so that the generated code can be transmitted to the memory 42 by the data line 45.

The deciphering device (not shown) corresponding to this embodiment of the ciphering device is designed in a corresponding way with shift register, buffer, computer, memory etc. The computer in the deciphering device generates a new code to its memory by means of the same algorithm as used by the computer 43 of the ciphering device. The computer of the deciphering device further relies on the same criteria as the computer 43 for deciding when the transmission of a new code to the memory should take place. In this manner, the content in the two memories will always be the same.

It should also be pointed out that the code for preventing deciphering of previously tapped information should be generated in such a manner that it cannot be mathematically traced backwards in time. To those skilled in the art, this type of algorithms is well known and will therefore not be described in more detail here.

As mentioned above, major advantages of this code-generating method are that information can be kept secret also after transmission, that it is not necessary to transmit a code between the devices, and that the code generation is not dependent upon the information on the transmission line between the ciphering device and the deciphering device, but yet takes place synchronously in both devices.

In addition to establishing when a new code is finally created, the clock 48 is used for synchronizing purposes. Synchronization is performed in that certain predetermined events, e.g. certain bit patterns or interruptions in the information transmission, are used as time references for the clocks in both devices. When such a predetermined event occurs, the clock is set to a known state. The advantage of this synchronizing procedure is that information common to both devices is used, this making synchronization very accurate.

Many modifications and alterations may of course be carried out in the present invention without departing from the scope of the accompanying claims, and the above specification should thus only be considered as an example which is in no way limitative of the invention. For example, it is possible to connect more than two code units in series and to provide components according to FIGS. 4–6 between each pair of adjoining code units.

I claim:

1. A ciphering device for serially transmitted information, comprising an input for a sequence of bits to be ciphered, an output for the ciphered bit sequence, a mixing unit having a first input for said sequence of bits to be ciphered, a second input for code bits for ciphering said bit sequence, and an output for said ciphered bit sequence, a first code unit comprising a shift register having an input for the ciphered bit sequence, and a memory addressed with bits from said shift register, and a second code unit connected to the first code unit and comprising a shift register and a memory which is addressed with bits from said shift register of the second code unit and the output of which is connected to said second input of the mixing unit.

2. Ciphering device as claimed in claim 1 further comprising a third shift register which is disposed between the two code units and the input of which is connected to the first code unit, and an EXOR gate which on its inputs receives bits from said third shift register and the output of which is connected to the shift register of said second code unit.

3. Ciphering device as claimed in claim 1, further comprising a third shift register which is disposed between the code units and the input of which is connected to the first code unit, and a read-write memory which is addressed with bits from said third shift register and the output of which is connected to the shift register of said second code unit.

4. Ciphering device as claimed in claim 3, further comprising a computer adapted to generate code bits according to a predetermined algorithm to write the generated code bits into the memory.

5. A deciphering device for serially transmitted information, comprising an input for a sequence of bits to be deciphered, an output for the deciphered bit sequence, a mixing unit having a first input for said sequence of bits to be deciphered, a second input for code bits for deciphering said bit sequence, and an output for said deciphered bit sequence, a first code unit comprising a shift register having an input for the sequence, of bits to be deciphered, and a memory addressed with bits from said shift register, and a second code unit connected to the first code unit and comprising a shift register and a memory which is addressed with bits from said shift register of the second code unit and the output of which is connected to said second input of the mixing unit.

6. Deciphering device as claimed in claim 5, further comprising a third shift register which is disposed between the two code units and the input of which is connected to the first code unit, and an EXOR gate which on its input receives bits from said third shift register and the output of which is connected to the shift register of the said second code unit.

7. Deciphering device as claimed in claim 5, further comprising a third shift register which is disposed between the two code units and the input of which is connected to the first code unit, and a read-write memory which is addressed with bits from said third shift register and the output of which is connected to the shift register of said second code unit.

8. Deciphering device as claimed in claim 7, further comprising a computer which is adapted to generate code bits according to a predetermined algorithm and to write the generated code bits into the memory.

* * * * *